March 16, 1926.     1,577,041
J. F. LUETH
SHOCK ABSORBER
Filed Feb. 16, 1925     2 Sheets-Sheet 1

Inventor:
John F. Lueth
By Young & Young
Attorneys

March 16, 1926. 1,577,041
J. F. LUETH
SHOCK ABSORBER
Filed Feb. 16, 1925   2 Sheets-Sheet 2

Inventor:
John F. Lueth
By
Attorneys

Patented Mar. 16, 1926.

1,577,041

UNITED STATES PATENT OFFICE.

JOHN F. LUETH, OF ROXBURY, WISCONSIN.

SHOCK ABSORBER.

Application filed February 16, 1925. Serial No. 9,497.

*To all whom it may concern:*

Be it known that I, JOHN F. LUETH, a citizen of the United States, and resident of the town of Roxbury, in the county of Dane and State of Wisconsin, have invented certain new and useful Improvements in Shock Absorbers; and I do hereby declare that the following is a full, clear, and exact description thereof.

This invention relates to shock absorbers.

Objects of this invention are to provide a shock absorber for automobiles and similar vehicles, which is so constructed that it will permit free movement of the axle away from its normal position either upwardly or downwardly, but will resist the motion of the axle back to its normal position no matter from which side the axle is returning.

A further object of the invention is to provide a shock absorber which will offer resistance for an increased length of travel in proportion to the amount of deflection of the axle, so that the total amount of energy absorbed by the shock absorber is proportionate to the displacement of the axle from its normal position.

Further objects are to provide a device which is of extremely simple construction although functioning in the manner described, and which may be readily applied to automobiles in a simple manner.

An embodiment of the invention is shown in the accompanying drawings, in which the device is shown as schematically applied to an automobile axle.

Figure 1:
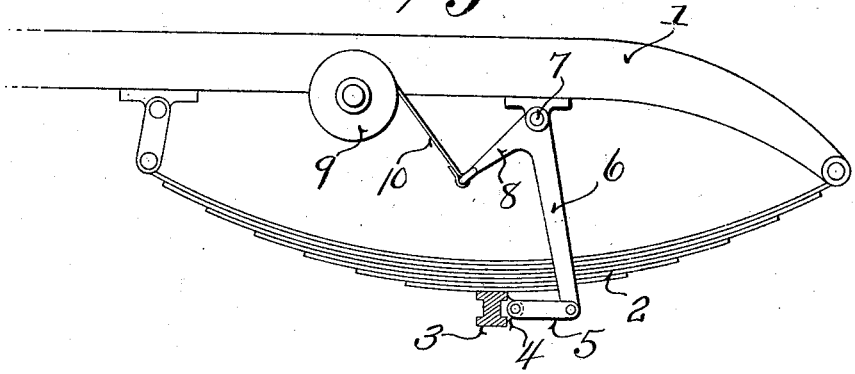
Figure 1 is a fragmentary view of a portion of an automobile frame, spring and axle showing the device in normal position.

Referring to the drawings, it will be seen that an automobile frame 1 has been illustrated, as provided with a spring 2 attached to an axle 3. This axle is provided with lugs 4 beneath each side frame. Each of these lugs is connected by means of a short link 5 with the lower end of a lever 6 pivotally mounted, as indicated at 7, upon a bracket secured to the under side of the frame. The lever 6 is also provided with an integral angularly offset arm 8 preferably shorter than the arm 6.

Any of the usual types of snubber wheels or friction devices, indicated generally at 9, may be employed. These devices, as is well known, automatically and freely wind in a strap or flexible member 10, but offer frictional resistance to its withdrawal.

Figure 2:
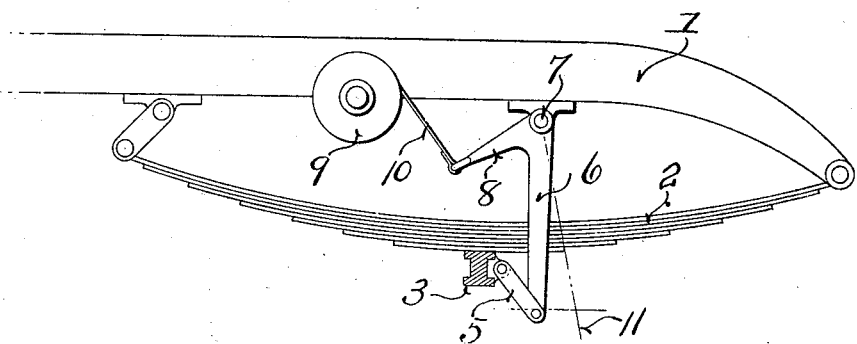
Figure 2 shows the position assumed by the parts when the axle is displaced upwardly with reference to the frame.

The operation of the apparatus is as follows: Assuming the parts are in the position shown in Figure 1 which corresponds to their normal position; if the axle is now deflected upwardly with reference to the side frame, the lever 6 is rocked in a clockwise direction making an angle with its original center line, such as indicated at 11 in Figure 2. The strap 10 is reeled into the friction device 9 in a free manner. However, when the axle moves downwardly it forces the lever 6 in a counter-clockwise direction back to its normal center line 11. This motion is transmitted to the strap 10 by means of the short arm 8 and retraction of this strap is resisted in a frictional manner by means of the friction device 9. Thus the return motion of the axle is frictionally resisted.

Figure 3:
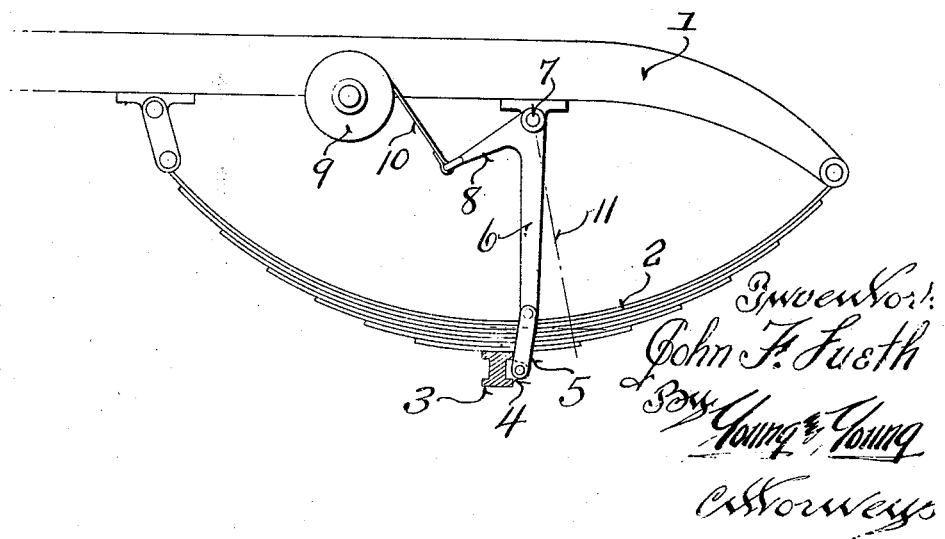
Figure 3 is a corresponding view showing the position of the parts when the axle is displaced downwardly with reference to the frame.

If, on the other hand, the axle is displaced downwardly with reference to the side frame, as shown in Figure 3, the lever 6 is again rocked in a clockwise direction and the strap 10 is freely reeled into the friction device 9. However, when the axle moves upwardly towards its normal position, it rocks the lever 6 in a counter-clockwise direction back to its initial center line 11, thus withdrawing the strap 10 from the friction device. This rocking motion of the lever is resisted by the friction device, as previously described.

It is to be noted from this description that the strap is reeled into the friction device 9 in a free and easy manner whenever the axle is displaced from its normal position whether upwardly or downwardly, and that the return motion of the axle is frictionally resisted, as it is necessary, through the mechanism described, to withdraw the strap 10 from the friction device 9.

Figure 4:
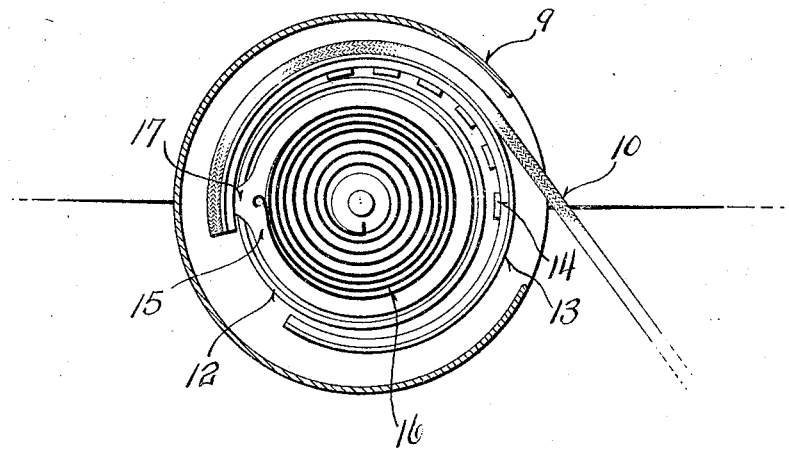
Figure 4 is a sectional view through the frictional device or snubber, such snubber being of the conventional form.
Figure 5:
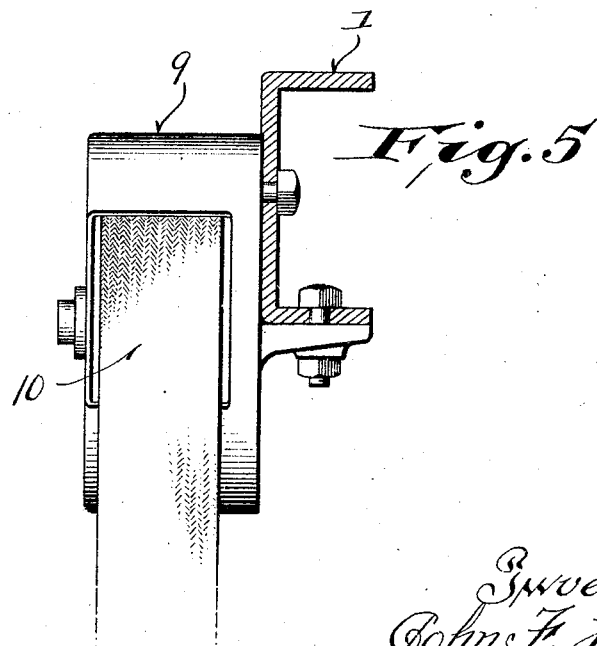
Figure 5 is a front view of the snubber showing a portion of the side frame bar of the automobile in section.

Referring to Figures 4 and 5 which illustrates the snubber, it will be seen that such snubber consists of an outer casing within which a friction drum 12 is rigidly positioned. This friction drum is loosely surrounded by a curved arm 13 provided with brake shoes or friction pads 14. In turn the arm 13 is surrounded by the strap 10 whose end is secured to such arm. Further, an annular member 15 surrounds a spiral spring 16 whose inner end is fixed, as shown, and whose outer end is attached to the annular member 15. This annular member has a projecting tongue 17 which engages the arm 13 and pulls against the strap 10. However, when the strap is allowed to move inwardly under the influence of the spring, it is coiled about the member 13 and forces the friction pads 14 into engagement with the stationary drum 12. When the strap is pulled outwardly, its outward motion is resisted by the friction between the pads and the stationary drum.

It will be seen, therefore, that dangerous bouncing of the car is avoided, as each rebound, whether upwardly or downwardly, is checked. Further, it is to be noted that the total amount of energy expended in the friction device is proportional to the distance of displacement of the axle and, therefore, for a great displacement, a relatively great energy absorption takes place, and thus automatically provides for a greater resistance or absorption for a greater displacement than for a smaller displacement.

It is to be distinctly understood that the disclosure is merely illustrative of the invention, and that the drawings are schematic of the device showing one mode of application to a conventional type of automobile.

It will thus be seen that a very effective shock absorber has been provided which is of simple construction and has relatively few parts.

Further, it will be seen that the shock absorber is highly efficient in operation and will prevent bouncing of the car irrespective of the direction of deflection of the axle with reference to the side frame.

Although the invention has been described in considerable detail, it is to be understood that the invention may be variously embodied and is, therefore, to be limited only as claimed.

I claim:

In an automobile, the combination of a side frame, an axle, a spring connecting said axle and side frame, a lever pivotally carried by said side frame and having a downwardly extending long arm and outwardly extending short arm, a link connecting said axle and the long arm of said lever, and a friction device carried by the side frame and connected with the short arm of said lever, said friction device resisting motion of the short arm in one direction only.

In testimony that I claim the foregoing I have hereunto set my hand at Lodi, in the county of Columbia and State of Wisconsin.

JOHN F. LUETH.